United States Patent [19]

Klingstedt

[11] Patent Number: 4,671,698

[45] Date of Patent: Jun. 9, 1987

[54] SLEEVE FOR INTERCONNECTING RODS PROVIDED WITH THREADS

[75] Inventor: Holger Klingstedt, Skellefteå, Sweden

[73] Assignee: Crenova AB, Skellefteå, Sweden

[21] Appl. No.: 856,411

[22] Filed: Apr. 28, 1986

[30] Foreign Application Priority Data

Apr. 29, 1985 [SE] Sweden ................................ 8502076

[51] Int. Cl.$^4$ ................................................ F16D 1/00
[52] U.S. Cl. .................................... 403/341; 403/393; 403/286
[58] Field of Search ................ 403/341, 393, 286

[56] References Cited

U.S. PATENT DOCUMENTS

| 500,153 | 6/1893 | Parman | 403/341 X |
| 3,039,800 | 6/1962 | Morse | 403/341 X |
| 4,289,415 | 9/1981 | Fishinger | 403/341 X |

Primary Examiner—Andrew V. Kundrat
Attorney, Agent, or Firm—Burns, Doane, Swecker & Mathis

[57] ABSTRACT

The invention relates to a sleeve (1) for interconnecting rods (3, 5) provided with threads. The sleeve (1) has an opening in each end, said openings preferably having a different size and/or form. The inside form of the sleeve (1) is such that when the rods (3, 5) are combined to a mutual threaded engagement the sleeve (1) can be axially fitted to the overlapping area of the combined rods (3, 5). The inside dimension of the sleeve (1) is such that it makes separation of the rods (3, 5) in their position fitted on the overlapping area impossible as well as elimination of the mutual thread engagement. The sleeve (1) enables a rapid, simple and reliable joining of rods (3, 5) provided with threads with a free choice of the length of the overlapping area.

6 Claims, 6 Drawing Figures

FIG. 1
FIG. 2
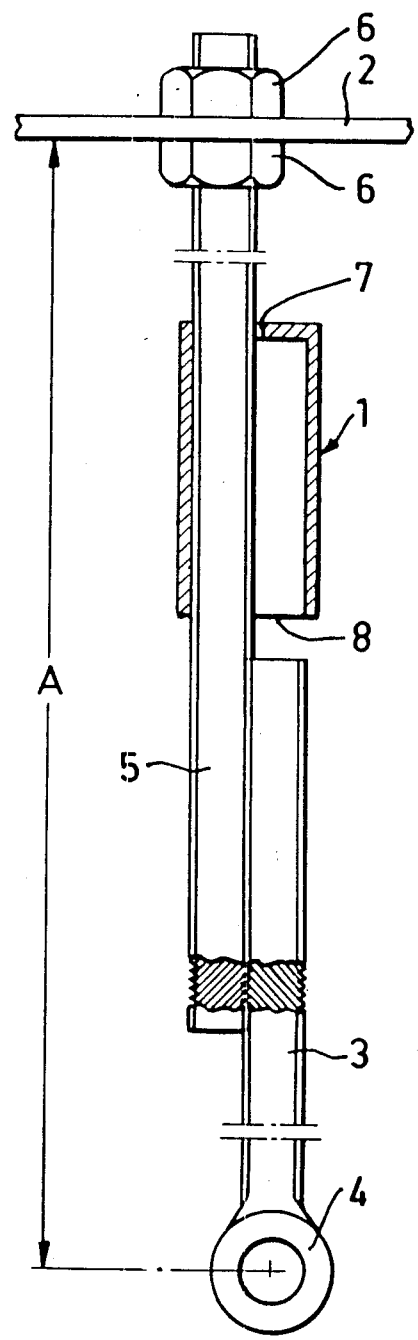
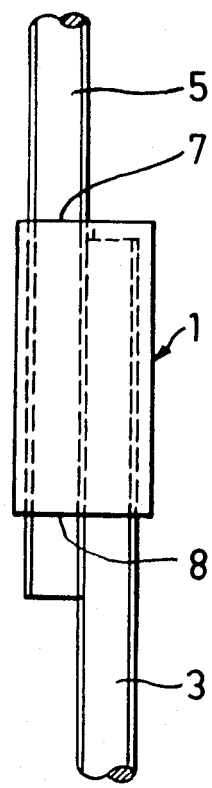

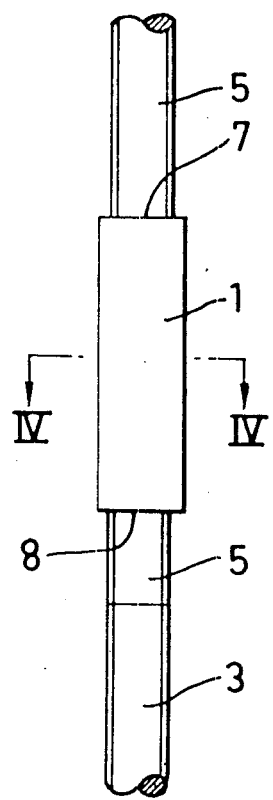
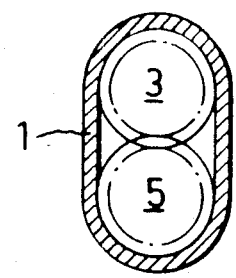
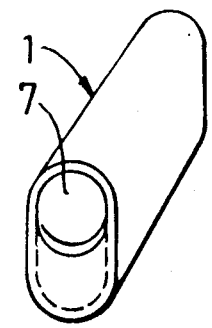
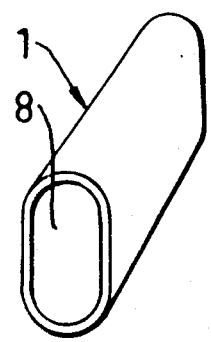

SLEEVE FOR INTERCONNECTING RODS PROVIDED WITH THREADS

BACKGROUND OF THE INVENTION

This invention relates to a sleeve for interconnecting rods provided with threads.

It is common practice to use a series of different connections to hang objects on rods provided with threads as there are good possibilities because of the threads to adjust the desired position of the objects to be hung. Said adjustment of position is then usually carried out in that the attaching nuts of the rod are moved along the rod until the object gets in the desired position. Said adjustment which may involve long displacements of the nuts is mostly time-consuming and sometimes projecting rod ends must be removed because of considerations of space and safety or for aesthetical reasons. If it is desired to avoid a later cutting of assembled rods, a varying assortment of lengths of the threaded rods is required in many cases. Such is the case when pipes are suspended that are intended to have a certain inclination so that liquid can run automatically.

OBJECTS AND SUMMARY OF THE INVENTION

It is the object of this invention to offer a sleeve which simplifies suspension of objects to a very high degree by means of rods provided with threads.

A rapid, simple and reliable connection of two rods provided with threads is made possible by means of a sleeve according to the invention. This allows the length between the free ends of the rods to be chosen as desired within a large range in connection with their joining.

If it is desired to change said length after performed assembly this can also be done very rapidly and simply without any need of tools.

BRIEF DESCRIPTION OF THE DRAWINGS

Illustrative examples of the invention will be described in the following in greater detail with reference to the enclosed drawings in which FIG. 1 is a view of an example of a sleeve according to the present invention in a mounting phase, FIGS. 2 and 3 are views of a finished connection by means of the sleeve of the invention in two side views, FIG. 4 is a view of a cross section of the connection taken along the line IV—IV in FIG. 3, and FIGS. 5 and 6 are reviews of the sleeve of the invention in two different perspective views.

DETAILED DESCRIPTION OF THE PREFERRED EMBODIMENT

An example of a use of the inventive sleeve 1 is shown in FIG. 1. In this case it is desired to hang a detail (not shown) at a certain distance below a suspension rail 2. The detail to be hung is connected with a threaded rod 3 which is for instance provided with a mounting loop 4 in one of its ends. Another threaded rod 5 is fixed by means of e.g., nuts 6 to the rail 2. The inventive sleeve 1 is thereafter fitted to the position shown in FIG. 1 after which the rods 3 and 5 are combined so that a desired distance A is obtained and the rods will be in a threaded engagement with each other. The connection is then completed by fitting the sleeve 1 to the overlapping area of the combined rods 3, 5. FIGS. 2 and 3 show the sleeve 1 in its position fitted onto the rods 3 and 5.

If for some reason it is desired to change the distance A afterwards this is simply carried out by removing the sleeve 1 so that the overlapping area of the rods 3, 5 is made free after which the overlapping length of the rods is changed as desired and the sleeve 1 is again fitted onto the overlapping area of the combined rods.

The sleeve has preferably a relatively smooth inside surface and its inside dimension is such that it makes separation of the rods 3, 5 in their position fitted on the overlapping area impossible. It also prevents elimination of the mutual threaded engagement. FIG. 4 shows an example of a suitable cross sectional form of the sleeve 1 at joining of two threaded rods 3, 5. If the sleeve 1 is made according to FIGS. 4-6 a very good fixation of the rods relative to one another in all directions is obtained in respect of turning and the fixing ability of the sleeve can be further improved by increasing the length of the sleeve.

By providing one end of the sleeve 1 with an opening 7 which is smaller or has another form than the sleeve opening 8 controlled by function and, when using the sleeve 1, turning the opening 7 upwards when possible, see FIGS. 1-3, it is possible to prevent the sleeve 1 from moving, e.g. due to vibrational influence, from the place intended to fill its function. At the same time the immediate surroundings of the opening 7 serve as stop means when fitting the sleeve over the joining area and will ensure in this way that the sleeve will be positioned correctly.

If desired, the opening 7 can be designed so that it also serves as an inspection window for an ocular control of the overlapping length of the rods 3, 5 and to establish visually that the sleeve is completely fitted in the connection area.

Moreover, it can be mentioned that the strength of the connection can be adjusted by a choice of a suitable sleeve length.

It will be appreciated that more than two rods provided with threads of course can be interconnected by the aid of a sleeve made according to the inventive idea. The sleeve need not necessarily have the shown cross sectional form, either, but a series of other cross sectional forms are possible maintaining the inventive idea. The opening 7 need not necessarily be smaller, either, than the opening 8 but the intended stop effect can also be obtained by the opening 7 having another form than the opening 8.

Thus, the invention is not restricted to what has been shown and described but amendments and modifications thereof are possible within the scope of the appended claims.

What I claim is:

1. A sleeve for interconnecting threaded rods, comprising:
    sleeve means for retaining together said threaded rods when said rods are in mutually threaded engagement with each other so as to allow said rods to be freely rotated with respect to each other, said sleeve means being sufficiently narrow to prevent said rods from becoming disengaged from each other while said rods are within said sleeve means;
    one end of said sleeve means being partially closed assymetrically with respect to its longitudinal axis so s to allow only one rod to extend therethrough.

2. The sleeve according to claim 1, wherein said sleeve is adapted to retain two rods together.

3. The sleeve according to claim 1, wherein the inside form of the sleeve is adapted to the outer contour of the overlapping area of the rods provided with threads so that the rods are mutually fixed substantially rigidly except for their rotating ability about their longitudinal axes.

4. The sleeve according to claim 1, wherein the other end of said sleeve means is open such that all of said rods may extend therethrough.

5. The sleeve according to claim 1, further comprising an inspection window at the one end.

6. The sleeve according to claim 1, wherein the inside surface of said sleeve means is smooth.

* * * * *